3,499,819
LAMINATES OF ALUMINUM AND POLYPROPYL-
ENE FOAM AND METHOD THEREFOR
John R. Lewis, Wilmington, Del., assignor to Hercules
Incorporated, Wilmington, Del., a corporation of
Delaware
No Drawing. Filed Apr. 20, 1967, Ser. No. 632,223
Int. Cl. B32b 5/18, 15/20, 31/22
U.S. Cl. 161—161                                    4 Claims

ABSTRACT OF THE DISCLOSURE

Laminates of polypropylene foam and aluminum having good adhesion by initially priming the aluminum with a very thin layer of a maleic anhydride modified polypropylene.

---

This invention relates to the preparation of high strength, lightweight laminated structures from polypropylene foam and aluminum.

Laminates of polyolefins and lightweight metals such as aluminum have been prepared in the past. However, most such laminates have been deficient in their bonding between the polyolefin and the aluminum phases. Those which have been disclosed, whose bond strengths were acceptable, have required a very complicated treatment to prepare the aluminum surface for bonding to the polymer. Even these, however, have not been totally satisfactory.

In accordance with this invention, it has been found that useful, strongly bonded polypropylene foam and aluminum laminates can be prepared if the aluminum surfaces which are to contact the polypropylene foam are initially treated with a primer comprised of either crystalline or amorphous polypropylene which has been modified by chemical combination with maleic anhydride. The instant invention, therefore, is a process for preparing high strength, lightweight structures composed of a polypropylene foam core sandwiched between two aluminum skin sections, which process comprises treating the inner surfaces of the aluminum skins with amorphous or crystalline polypropylene which has been modified by chemical combination with maleic anhydride, placing a foamable stereoregular polypropylene layer between two such treated aluminum skins, and subjecting the resulting unbonded sandwich to heat and pressure whereby controlled foaming and bonding of the polypropylene layer to the aluminum skins is caused to take place.

The unique foam sandwiches of this invention can be made in a great variety of forms, depending upon the end use contemplated. For example, a strong, rigid structure can be prepared by using relatively thick aluminum skins, or a highly flexible, tape-like material can be prepared using very thin metal skins and foaming the core section lightly.

The modified propylene polymers employed in the present invention are solid, resinous polymeric materials containing about 0.05 to about 5.0% and preferably about 0.5 to about 4.0%, maleic anhydride, by weight of the polymer. Such modified polymers can be prepared by reacting maleic anhydride with any solid propylene polymer containing active centers or sites which are capable of anchoring the maleic anhydride thereon. Active centers at which anchoring will occur can readily be induced on the propylene polymers in known ways, as for example, by subjecting the polymer to the action of high energy ionizing radiations such as gamma rays, X-rays, or high speed electrons; by contacting the polymer, either as a solid or as a solution in a solvent, with a free radical-producing material such as dibenzoyl peroxide, dilauryl peroxide, dicumyl peroxide, t-butyl perbenzoate; or by simply milling the polymer in the presence of air. Preferably, the modified propylene polymers are prepared by reacting maleic anhydride with a solution of either amorphous or crystalline polypropylene in an organic solvent containing a free radical-producing material.

In order to assure bonding of the modified polypropylene to the aluminum skins, no particular treatment of the aluminum is required. It is only essential that the aluminum be clean, i.e., free of dirt and grease. This cleanliness can easily be assured by rinsing in, e.g., toluene. If desired, however, the aluminum surface can be roughened, as by sand or grit blasting. Such a roughened surface will, as in the case of any coating process, afford improved bond strength since it increases the effective surface area. However, for most purposes, sufficiently strong bonds are obtained without any specific roughening of the surface.

The maleic anhydride modified polypropylene need only be applied in thin layers in order to effect excellent bonding to the polypropylene foam layer and the aluminum skin. In general, a maximum coating of about 0.1 mil is sufficient.

The coating can be applied by any convenient means. A preferred technique for applying a coating of uniform thickness is solution coating using a solvent such as an aliphatic or aromatic hydrocarbon or a chlorinated hydrocarbon. Solution application is particularly convenient when the maleic-modified polymer is one of the amorphous types since these are readily soluble in a variety of solvents at room temperature. When the crystalline modification is used, the solution application must be effected at elevated temperature. Spraying, brushing, and dipping are effective methods of application using solution coating.

It is also possible to apply the polymer coating by spraying or brushing a dispersion thereof in a volatile liquid medium onto the aluminum substrate, followed by heating to fuse the dispersed particles into a continuous film. Other coating techniques which are useful at times include hot melt coating, flame spraying, electrostatic spraying, airless atomization, and fluid bed coating.

The polypropylene layer which forms the core of the composite structures of this invention is formed into an unfoamed plaque or film prior to the combination thereof with the aluminum skins. This can be effected, e.g., by extrusion, compression molding or injection molding. Since the polymer contains a foaming agent additive, the plaque forming operation must be carried out at a temperature below that at which the foaming agent is activated. The thickness of the plaque will vary, depending upon the intended thickness and the intended degree of foaming contemplated for the finished structure. In general, this will be from about 0.2 to 1 inch.

The foaming agents added to the polypropylene core material are a known class of materials which cause foaming by decomposing at elevated temperatures with liberation of gases which expand to form bubbles within the molten polymer. Exemplary of these materials are: azo bis(formamide), diazoaminobenzene, N,N'-dinitrosopentamethylene tetramine, N,N'-dimethyl-N,N'-dinitrosoterephthalamide, p,p'-oxy-bis(benzene sulfonyl semicarbazide), azo bis(isobutyronitrile), p,p'-oxy-bis(benzene sulfonyl hydrazide), p,p'-diphenyl-bis(sulfonyl hydrazide), benzene sulfonyl hydrazide, m-benzene-bis (sulfonyl hydrazide), etc. Any of the well-known solvent blowing agents may also be used in this invention, as for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at least one mole of gas per mole of blowing agent at a temperature of 190° C. or less may be used.

In order to limit the foaming to no more than the desired amount, the foaming is carried out in a restricted space. For example, foaming can be carried out in a picture frame type mold adapted to permit just the desired amount of foaming. The polymer and aluminum panels can also be placed between plates and heated in a press. Taking care that the press platens remain in contact with the aluminum panels at all times, the press can be opened to the right point to permit the desired amount of foaming.

In many instances, it will be desirable to cross-link the foam for added strength or to assure the attainment of sufficiently low density. This can readily be accomplished by the inclusion in the composition of a cross-linker which can be activated by the heat applied to effect foaming and bonding of the polypropylene core. A preferred class of cross-linking agents which can be used to this end are the poly(sulfonazides) having the general formula $R(SO_2N_3)_x$ where R is an organic radical inert to the cross-linking reaction and $x$ is an integer greater than 1, preferably 2 to 100. The radical R can be an alkylene, cycloalkylene, arylene, aralkylene, or alkarylene radical. Exemplary but not all incusive of the poly(sulfonazides) which are useful include 1,7-heptane - bis(sulfonazide), 1,10-decane-bis(sulfonazide), 1,12-dodecane-bis(sulfonazide), 1,4-cyclohexane-bis(sulfonazide), 1,4-benzene-bis(sulfonazide), 1,9,18-octadecane-tris(sulfonazide), 4,4-diphenyl disulfide-bis(sulfonazide), and 1-octyl-2,4,6-benzene-tris(sulfonazide).

Another preferred class of cross-linking agents are the azidoformates having the general formula

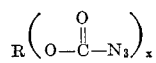

where $x$ is an integer greater than 1, preferably 2 to about 100, and R is an organic radical inert to the cross-linking reaction and having at least one carbon atom per azidoformate group. Exemplary of such aziodoformates are the aliphatic azidoformates such as tetramethylene-bis (azidoformate), pentamethylene-bis(azidoformate); the cycloaliphatic azidoformates such as the cyclohexylene-1,2'; 1,3'; and 1,4-bis(azidoformate)s; the aromatic azidoformates such as $\alpha,\alpha'$-p-xylylene-bis(azidoformate), 2,2' - isopropylidene - bis(p,p'-phenylazidoformate); the azidoformate ethers such as 2,2'-oxydiethyl-bis(azidoformate), 2,2'-oxydipropyl-bis(azidoformate, 2,2'-ethylenedioxydiethyl-bis(azidoformate), the tetraazidoformate of pentaerythritol—propylene oxide adduct, the azidoformate thioethers such as 2,2'-thiodiethyl-bis(azidoformate), 4,4'-thiodibutyl-bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides that can be used are m-phenylene diazide, 2,4,6-triazidobenzene, 4,4'-diphenyl diazide, 4,4'-diphenylmethane diazide, 4,4'-diazido diphenylamine, 4,4'-diazido diphenylsulfone, 2,7-diazidonaphthalene and 2,6-diazidonathraquinone.

The polypropylene foam core material can also contain other materials to impart specific properties thereto. In particular, it can, and usually will, contain an antioxidant, heat stabilizer or light stabilizer. Reinforcing fillers such as glass or asbestos fibers, silica, and the like can also be present, if needed. In some cases, pigments can also be included. For some purposes, it may be desirable to include a natural or synthetic elastomer to increase the flexibility of the foam. This can easily be done by blending the elastomer into the polypropylene foaming agent and other components prior to foaming so that the elastomer and polypropylene are foam simultaneously. Polyisobutylene, butyl rubber and copolymers containing ethylene and propylene work well in this application.

The following examples are presented to illustrate the process of the invention. Parts and percentages are by weight in all cases unless otherwise specified.

EXAMPLE 1

Panels of aluminum metal 0.025" thick were degreased by immersion in toluene at room temperature. These are then primed by spraying a 1% xylene dispersion of maleic anhydride modified crystalline polypropylene (0.6% MA, RSV 1.2) onto the panels and baking at 200° C. for 3 minutes.

A polypropylene formulation containing 100 parts crystalline polypropylene, 0.6 part azobisformamide having agent, 0.6 part decamethylene disulfonazide, and 0.1 part $Na_2CO_3$ was two roll milled at 171° C. and pressed into a plaque 0.167 inch thick at 182° C.

The plaque was sandwiched between two of the primed aluminum panels and the sandwich was inserted in a press and heated to about 440° F. for about 10 minutes. As the plastic foamed, the press was gradually opened to permit expansion of the sandwich in the vertical direction until a thickness of 0.5 inch was attained. The overall density of the laminate after cooling was 0.63 g./cc. indicating foam core density of about 0.32 g./cc.

The flexural properties, measured on 7" x ½" strips over a 5" span at 0.8 in./minute were as follows:

|  | P.s.i. |
|---|---|
| Strength | 7,400 |
| Modulus | 510,000 |

Example 2

Aluminum panels .012 inch thick were degreased as in Example 1 primed with a 2% dispersion of maleic anhydride modified crystalline, polypropylene (0.6% MH, RSV 1.2) and baked at 200° C. for 5 minutes.

A polypropylene formulation containing 105.1 parts of stereoregular polypropylene 0.7 part of azobisformamide, 0.4 part nonane disulfonazide, and 0.4 gram sodium carbonate was two roll milled at 171° C. and pressed into a plaque 10 x 10 x 0.105 inches at 182° F. for 1½ minutes to form a foamable preform.

The foamable preform was sandwiched between 2 sheets of 1 mil polypropylene film and this, in turn was sandwiched between the aluminum plates with the film in contact with the primed aluminum surfaces. The sandwich was placed in a press maintained at 225° C., and the press was allowed to open to form a foam sandwich having a total thickness of about 0.3 inch.

The tensile strength of this laminate in a direction perpendicular to the plane of the aluminum skins was 180 lbs./sq. in. Similar laminates prepared with unprimed aluminum could be pulled apart by hand.

The composite structures prepared according to this invention can be used in a variety of applications where a high strength to weight ratio is desirable. Examples of such uses include building panels, automobile or airplane bodies, luggage and boats, among others.

What I claim and desire to protect by Letters Patent is:

1. A process for preparing high strength, lightweight structures having a polypropylene foam core between two aluminum skin sections which process comprises treating the inner surfaces of the aluminum skins with maleic anhydride modified polypropylene, placing a foamable stereoregular polypropylene layer between two such treated aluminum skins and subjecting the unbonded sandwich to heat and pressure whereby controlled foaming and bonding of the polypropylene layer to the aluminum skins is caused to take place.

2. The process of claim 1 where the maleic anhydride modified polypropylene is crystalline polypropylene.

3. The process of claim 1 where the foamable polypropylene layer contains a polypropylene crosslinking agent which is activated by the heat applied to effect foaming.

4. A high strength, low density laminated structure comprising a polypropylene foam core sandwiched between two surface layers of aluminum, said aluminum being primed with maleic anhydride modified polypropylene to promote its adhesion to the aforesaid polypropylene foam core.

References Cited

UNITED STATES PATENTS 3,352,742  11/1967  Zunich et al. _____ 161—161
3,415,714  12/1968  Hider _____ 161—161

ROBERT F. BURNETT, Primary Examiner

W. J. VAN BALEN, Assistant Examiner

U.S. Cl. X.R.

156—79; 161—216; 260—2.5; 264—45, 321